Aug. 30, 1932.  A. Y. DODGE  1,874,929

BRAKE

Filed July 19, 1929

INVENTOR
Adiel Y. Dodge
BY
Jn. W. McCauley
ATTORNEY

Patented Aug. 30, 1932

1,874,929

UNITED STATES PATENT OFFICE

ADIEL Y. DODGE, OF SOUTH BEND, INDIANA, ASSIGNOR TO BENDIX BRAKE COMPANY, OF SOUTH BEND, INDIANA, A CORPORATION OF ILLINOIS

BRAKE

Application filed July 19, 1929. Serial No. 379,333.

This invention relates to brakes, and is illustrated as embodied in a novel device for applying the brake friction means to the brake drum. An object of the invention is to provide a simple device which is adapted to be operated by a shaft or the like which is mounted in a fixed bearing. Preferably a novel carrier, on which thrust members such as rollers are so mounted as to engage the shoes of the brake, is provided by a torque member which is shiftable endwise in a transverse opening in the end of the brake camshaft.

Figure 1:
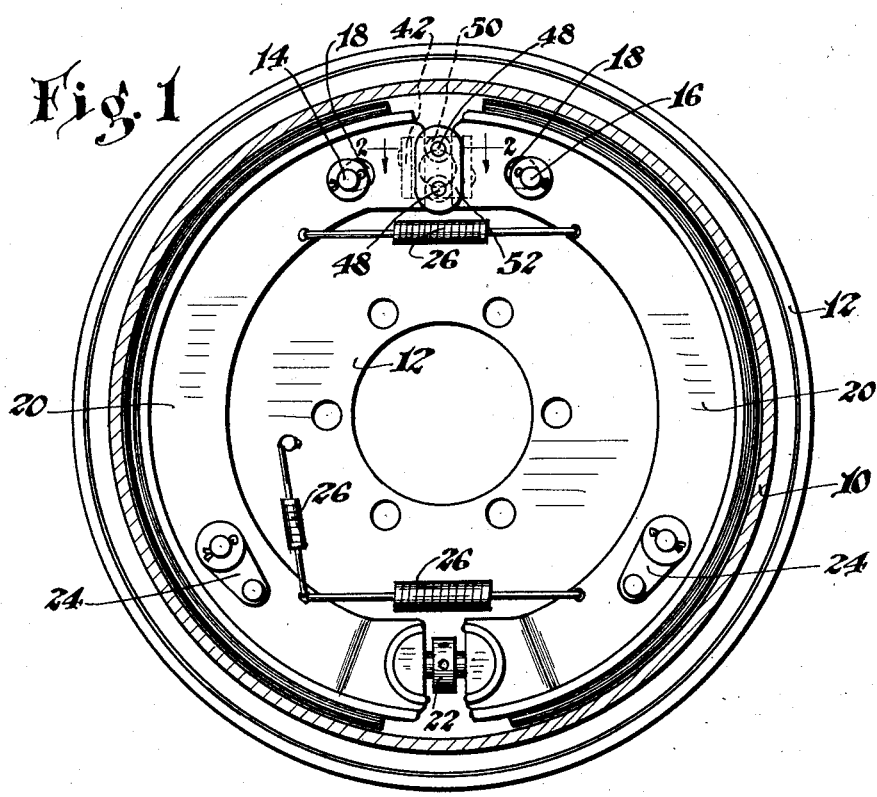
Figure 2:
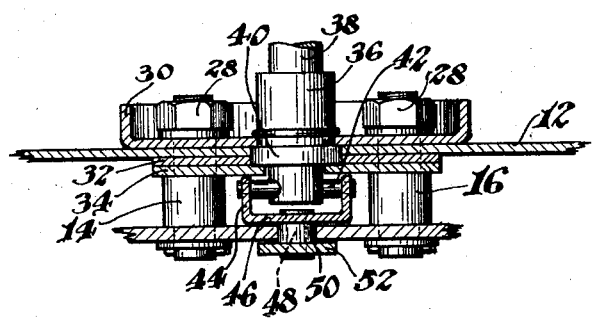

The above and other objects and features of the invention, including various novel and desirable details of construction, will be apparent from the following description of the illustrative embodiment shown in the accompanying drawing, in which:

Figure 1 is a vertical section through the brake, just inside the head of the brake drum, and showing the brake shoes in side elevation; and Figure 2 is a section through the applying means, on the line 2—2 of Figure 1.

The illustrated brake includes a drum 10, at the open side of which is a support such as a backing plate 12 carrying anchor posts 14 and 16 extending through relatively large openings 18 in shoes 20 connected by a floating expansible pivot joint 22 and having the usual steady rests 24 and return springs 26.

One shoe 20 anchors on post 14 when the drum is turning clockwise, and the other shoe 20 anchors on post 16 when the drum is turning counter-clockwise.

Posts 14 and 16 are shouldered, and provided with nuts 28, to clamp to the backing plate reinforcing plates 30, 32, and 34. Plate 32 and the backing plate form a support for a camshaft bearing 36 in which the camshaft 38 is journaled. The bearing 36 has a collar 40 embraced between plates 30 and 34, which hold it against endwise movement.

Shaft 38 has at its inner end a transverse opening receiving a torque member 42, capable of endwise shifting in the opening, and which is carried by spaced projections 44 of a novel U-shaped carrier 46 extending across the end of the shaft 38. Carrier 46 and projections 44 may be formed, as shown, as a single steel stamping. Carrier 46 has, on the side opposite the torque member 42, a pair of spaced pivots 48 carrying thrust members such as rollers 50. A reinforcing plate 52 may connect the ends of pivots 48. Plate 52 and the carrier 46 embrace between them the ends of shoes 20. It will be seen that, when the brake is applied, member 42 can shift endwise to permit rollers 50 to balance their thrusts on the shoes, regardless of the anchorage of the shoes.

While one illustrative embodiment has been described in detail, it is not my intention to limit the scope of the invention to that particular embodiment, or otherwise than by the terms of the appended claims.

I claim:

1. A brake-applying device comprising, in combination, a shaft having a transverse opening adjacent its end, a carrier extending across the end of the shaft and having a torque member mounted in said opening and shiftable endwise therein, and shoe-engaging parts carried by said carrier.

2. A brake-applying device comprising, in combination, a shaft having a transverse opening adjacent its end, and a carrier extending across said end and having a torque member mounted in said opening and shiftable endwise therein.

3. A brake-applying device comprising a U-shaped carrier having its sides connected by a torque member and carrying a pair of thrust parts on the side opposite said member.

4. A brake-applying device comprising a carrier having a torque member on one side and carrying a pair of thrust parts on the other side.

5. A device having on one side parallel projections connected by a torque member, and having on the other side a pair of spaced parallel pivots carrying thrust members.

6. A backing plate having a shaft bearing with a collar, and two plates embracing said collar and held by a pair of anchor posts on opposite sides of the bearing.

In testimony whereof, I have hereunto signed my name.

ADIEL Y. DODGE.